United States Patent
Uster (10) Patent No.: US 8,763,440 B2
(45) Date of Patent: Jul. 1, 2014

(54) CALIBRATION ARRANGEMENT FOR AN ELECTRONIC BALANCE

(75) Inventor: Markus Uster, Nänikon (CH)

(73) Assignee: Mettler-Toledo AG, Greifensee (CH)

( * ) Notice: Subject to any disclaimer, the term of this patent is extended or adjusted under 35 U.S.C. 154(b) by 724 days.

(21) Appl. No.: 13/069,734

(22) Filed: Mar. 23, 2011

(65) Prior Publication Data

US 2011/0232357 A1    Sep. 29, 2011

(30) Foreign Application Priority Data

Mar. 23, 2010 (EP) .................................. 10157388

(51) Int. Cl.
*G01G 23/01* (2006.01)

(52) U.S. Cl.
CPC ..................................... *G01G 23/01* (2013.01)
USPC ............................................ 73/1.13; 702/101

(58) Field of Classification Search
CPC ...................................................... G01F 23/01
See application file for complete search history.

(56) References Cited

U.S. PATENT DOCUMENTS

| | | | | |
|---|---|---|---|---|
| 2,718,139 | A * | 9/1955 | Young | 73/32 R |
| 2,733,560 | A * | 2/1956 | Strnad | 451/399 |
| 2,922,188 | A * | 1/1960 | Bossen | 425/140 |
| 3,656,337 | A * | 4/1972 | McDonald | 73/1.13 |
| 3,868,643 | A * | 2/1975 | Bullivant | 702/101 |
| 3,906,931 | A * | 9/1975 | Terekhov | 600/595 |
| 4,418,773 | A * | 12/1983 | Finet et al. | 73/1.13 X |
| 4,595,125 | A * | 6/1986 | Alwerud | 222/55 |
| 4,977,969 | A | 12/1990 | Leisinger et al. | |
| 5,058,692 | A | 10/1991 | Melcher et al. | |
| 6,745,487 | B1 * | 6/2004 | Nield | 33/735 |
| 7,395,689 | B2 | 7/2008 | Genoud et al. | |
| 7,432,497 | B2 * | 10/2008 | Sakagami et al. | 250/231.18 |
| 7,596,984 | B2 | 10/2009 | Genoud et al. | |
| 2003/0110003 | A1 | 6/2003 | Topmiller | |
| 2005/0017159 | A1 | 1/2005 | Hasegawa et al. | |
| 2005/0217592 | A1 * | 10/2005 | Larsen | 19/51.02 |
| 2009/0072130 | A1 | 3/2009 | Chase et al. | |
| 2011/0017521 | A1 * | 1/2011 | Birrer et al. | 177/232 |
| 2013/0239648 | A1 * | 9/2013 | Turner | 73/1.13 |

FOREIGN PATENT DOCUMENTS

| | | | | |
|---|---|---|---|---|
| EP | 1767909 A1 | | 3/2007 | |
| GB | 2259760 A | * | 3/1993 | 250/559.39 |
| JP | 01216217 A | * | 8/1989 | G01G 23/01 |
| SU | 1015261 A1 | * | 4/1983 | G01G 9/00 |
| WO | WO 8806712 A1 | * | 9/1888 | G01B 21/02 |

OTHER PUBLICATIONS

Derwemt-Acc-No. 2007-448679, Derwent abstract (2 pages) of EP-1767909 A1, EP-1767909 A1 published Mar. 28, 2007, and Patent Translate, Powered by EPO and Google, machine translation of the specification (10 pages) and claims (2 pages) of EP-1767909 A1.*

* cited by examiner

*Primary Examiner* — Thomas P Noland (74) *Attorney, Agent, or Firm* — Standley Law Group LLP (57) ABSTRACT

A method for adjusting a calibration arrangement of an electronic balance during the production process, wherein the calibration arrangement includes a transfer mechanism with a drive system, and wherein the calibration arrangement couples at least one calibration weight to the force-measuring device, said coupling being effected by the transfer mechanism transferring the calibration weight in a guided movement between a rest position and a calibration position. According to the method the distance between the end stops is determined by a counter system and stored into memory. Using the stored travel distance to calculate the rest position and the calibration position.

18 Claims, 5 Drawing Sheets

CALIBRATION ARRANGEMENT FOR AN ELECTRONIC BALANCE

CROSS-REFERENCE TO RELATED APPLICATIONS

This application is entitled to, and claims, benefit of a right of priority under 35 USC §119 from European patent application 10157388.9, filed on Mar. 23, 2010, the content of which is incorporated by reference as if fully recited herein.

TECHNICAL FIELD

Exemplary embodiments of the present invention concern a method to adjust, during the production process, a calibration arrangement of an electronic balance that includes a calibration arrangement and a force-measuring device. Exemplary embodiments of the present invention further cover a method of calibrating the balance as well as a device to perform the methods.

BACKGROUND

The sensitivity of a balance generally changes over time as a result of environmental influence factors such as fluctuations of the temperature and the barometric pressure, and also due to aging of components. Balances should therefore be recalibrated on a regular basis.

Electronic balances are in many cases calibrated by means of an internal calibration weight. To perform a calibration, a calibration weight of a defined mass is brought into force-transmitting contact with the force-transmitting device that is arranged in a force-measuring cell of a balance, or with the force-receiving part of the force-measuring cell, and a reference value is established. Based on this reference value, further weighing parameters of the balance can be adjusted. After the calibration has been successfully completed, the calibration weight is separated again from contact with the force-transmitting device or the force-receiving part and is secured in a rest position. In this calibration cycle, a transfer mechanism moves the calibration weight from a rest position into a calibration position and back to the rest position. In the calibration position, the calibration weight is in force-transmitting contact with the force-measuring cell, specifically with the force-receiving part of the latter. In the rest position, there is no force-transmitting contact. The range of movement of the calibration weight is limited in both directions by mechanical elements. These elements can be constituted for example by the support bearings of the spindle shaft, if the transfer mechanism is driven by way of a threaded spindle as disclosed in EP 1 873 504 A1, or by neighboring elements of a cam disk, if the calibration weight is supported by a cam disk that is coupled to the drive system as described in EP 1 674 841 A1. These mechanical limiting elements are called end stops. The positions of the end stops are individual to each balance.

According to the known state of the art, the end stops can be equipped with mechanical switches. These switches are activated by the transfer mechanism when the latter moves against one of the end stops, whereby the drive system is switched off. Such switches have the disadvantage that they will wear down to some degree over time. Furthermore, the switching actions can give rise to stresses and dislocations in the switch itself or for example in the support bearing of a threaded spindle of the aforementioned kind.

However, an improvement is achieved if the position immediately before the end stop is detected by means of an electro-optical sensor. For example, a circular disk with a cutout is mounted on the axle of the drive system and works together with a light gate. When the light gate detects the cutout in the disk, the drive system is stopped. This solution also has the disadvantage that it requires a precise and time-consuming adjustment procedure.

The fact that the position of the calibration weight is in general unknown represents a further disadvantage of switches.

In a calibration arrangement that is disclosed in CH 676750 A5, the distance traveled by the calibration weight is measured with an electronic revolution counter at the motor or with a mechanical registration of the angle of rotation of a toothed gear of a transmission. This concept has the disadvantage that because of the inaccuracy of the revolution counter the position of the calibration weight can only be roughly estimated.

Compared to the existing technology, exemplary embodiments of the inventive concept introduces a method to adjust the rest position and calibration position in the most efficient way possible and to control the movement of the calibration weight along its entire travel range.

It is therefore the object of the present invention to adjust the rest position and the calibration position in the most efficient way possible and to control the movement of the calibration weight along its entire travel range.

SUMMARY OF THE INVENTIVE CONCEPT

Exemplary embodiments of the inventive concept solves the task which occurs in the production process and concerns the setting of the rest position and the calibration position in the travel range of a calibration weight of a calibration arrangement for a balance that is equipped with a force-measuring by using a transfer mechanism to move calibration weight to a first end stop and then to the opposite end stop during the assembly phase. The travel distance between the two end stops is measured by means of a counter system, and the result is stored as a first parameter in a calibration control unit. Based on this total number of travel steps, further parameters are calculated and stored in the calibration control unit.

Other exemplary parameter of this kind may also be stored. For example, a second parameter representing the number of travel steps between the first end stop and the rest position may be stored. In addition, a third parameter representing the number of travel steps between the rest position and the calibration position (i.e., the distance to be traveled in the case of a calibration) may also be stored.

An advantage gained by exemplary embodiments of the inventive concept is that the setting of the travel range in the assembly phase of the calibration weight no longer requires a mechanical adjustment and can be performed in a very short time.

The concept of using the parameters calculated from the number of travel steps between the two end stops and a defined distance from the end stop has the advantage that the range of travel movement of the calibration weight does not reach the end stops. Thus, there are no mechanical reactions of the type that would be exerted by an end stop. This is important for the operating life of the balance.

A further distinguishing trait exhibited by exemplary embodiments herein is represented by the fact that by calculating the aforementioned parameter, the rest position and the calibration position are set.

In some exemplary embodiments of the inventive concept, the rest position and the calibration position are to be set back from the respective nearest end stop by at least two travel steps, while the sum of the two set-backs is not to exceed 5% of the total number of travel steps between the two end stops. This ensures that when the calibration weight is in the calibration position, there is reliable force-transmitting contact between the calibration weight and the force-measuring cell, and when the calibration weight is in the rest position, it is sufficiently far removed from the calibration position that a force-transmitting contact between the calibration weight and the force-measuring cell is impossible.

The number and/or the size of the travel steps need to be matched to the dimensions of the weighing cell, specifically of the calibration arrangement. This has the advantage that the method can be used for any type of balance, i.e. it is independent of the absolute distance between the two end stops.

In another exemplary embodiment, an initialization routine takes place during the start-up of the balance in order to ensure that the calibration weight is in its rest position before the balance is set into operating mode. In the initialization, the calibration weight is first moved to the calibration position, while the number of travel steps for this movement is counted. If the calibration weight reaches the calibration position before meeting the end stop, the movement is stopped at this point and the counter is set to zero. The calibration weight is then moved to the rest position based on a parameter representing the travel distance between calibration position and rest position. If in this phase the calibration weight arrives at the rest position without having traveled the predetermined number of travel steps between calibration position and rest position, the motor is stopped, the counter is set to zero, and the calibration weight is moved to the rest position based on a parameter representing the travel distance between the first end stop and the rest position. If the calibration weight is again stopped in its movement before arriving at the rest position, the conclusion could be drawn that the drive mechanism is defective.

It is of particular advantage that the position of the calibration weight is always known after the foregoing initialization routine has been completed. Thus, the movement of the calibration weight can be continued without problems even following a disruption such as a power failure, as the initialization routine is performed again in such cases.

In other exemplary embodiments, when a calibration is to be performed, the calibration weight is moved between the rest position and the calibration position according to the number of travel steps that have been stored as the distance between the rest position and the calibration position, while the travel distance covered is always measured by means of the counter system. Due to the use of the calculated parameters in the calibration process, the accuracy of the balance is assured in an expedient and safe manner.

Based on the position of the calibration weight, its travel speed can be controlled as a function of the remaining travel distance. This makes it possible, for example, to move the calibration weight faster and/or to stop the drive mechanism smoothly.

In another exemplary embodiment, the counter system can consist of a light gate and a disk with uniformly distributed passage holes. The distance between the holes determines the resolution of the counter system. Furthermore, this concept allows a contact-free counting of the travel steps. Instead of a disk perforated by holes, the counter system can also be equipped with a toothed wheel.

In still another exemplary embodiment, the counter system can have a bar with a linear series of holes. The light gate moves in this case relative to the bar. A guide post which is in any event already present can be equipped with evenly spaced holes, while the light gate moves together with the receiving seat of the calibration weight. As an alternative possibility, a threaded spindle which is already present could be optically scanned in an analogous way.

In some exemplary embodiments it may be advantageous if the counter system includes a multiplier-ratio device which allows a greater resolution in the counting of the travel steps.

Some exemplary embodiments have round or elongated holes. Holes that are close together and narrow can increase the accuracy of the counter system. However, some exemplary embodiments, instead of utilizing holes, can have a counter disk that includes indentations that are coated with a reflective material, in which case the optical scanning occurs by reflection.

In still other exemplary embodiments, the movement of the counter system can be amplified in order to ensure an even higher accuracy of the distance traveled by the calibration weight.

BRIEF DESCRIPTION OF THE DRAWINGS

In addition to the features mentioned above, other aspects of the method and device of the inventive concept will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Figure 1:
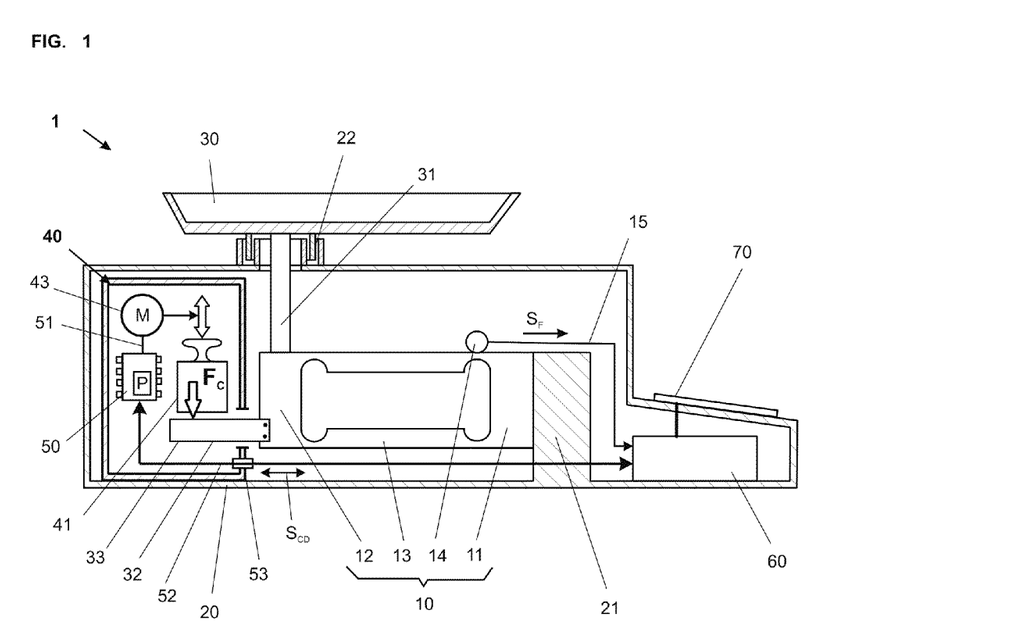
FIG. 1 schematically represents an exemplary embodiment of an electronic balance with a calibration arrangement.

FIG. 1 represents a schematic drawing of an exemplary force-measuring device 1 in the form of a balance which is shown in a sectional view. The balance has a housing 20. A force-measuring cell 10 is arranged in the space inside the housing.

The force-measuring cell 10 has a stationary part 11 and a movable part 12 which are connected to each other by an intermediate part 13 through flexible domains. The force-measuring cell 10 further includes a measurement sensor 14 which picks up the movements of the movable part 12 and converts them into a measurement signal $S_F$ corresponding to the movements. For simplicity's sake, the force-measuring cell 10 is shown with only one measurement sensor 14. Typically, however, four measurement sensors 14 are used, one at each of the flexible domains that connect the intermediate part 13 to the stationary part 11 and the movable part 12. With preference, strain gauges are used for the measurement sensors 14.

With its stationary part 11, the force-measuring cell 10 is rigidly connected to the housing 20 by way of a mounting post 21 which has a fixed connection to the housing. A load-receiving area 30 in the form of a weighing pan which is arranged outside of the housing 20 is connected through a rod 31 to the movable part 12 of the force-measuring cell 10 which is arranged in the space inside the housing. The rod 31 reaches through the housing 20, without touching the latter, by way of a passage opening 22 of the housing. The passage opening 22 is designed to prevent or at least strongly reduce the penetration of dirt into the interior.

The measurement sensor 14 is connected to a processing unit 60 through a measurement signal connection 15, in order to deliver the measurement signal $S_F$ of the measurement sensor 14 to the processing unit 60. The processing unit 60 is connected to the indicator unit 70 by way of the further connecting line in order to transmit the measurement values that were determined by the processing unit 60 to the indicator unit 70.

Also in the space inside the housing 20, a calibration arrangement 40 is located near the force-measuring cell 10. The calibration arrangement 40 is shown here with its own separate housing in which a calibration weight 41 is arranged which has a degree of mobility. The calibration weight 41 can be lifted and lowered by a drive mechanism 43. The drive mechanism is configured as an electric motor M which is controlled by appropriate control signals, for example by stepper pulses or through a suitable control of the power supply.

The calibration control unit 50 is connected on the one hand through a connector line to a connector junction 53. The connector junction 53, in turn, is connected by way of a connector line to the processing unit 60. These connector lines form a signal connection which is in this example configured as a communication line 52 for the bidirectional exchange of information signals $S_{CD}$ between the calibration control unit 50 and the processing unit 60. The calibration control unit 50 is on the other hand connected by way of a control line 51 to the electric motor M, so that the latter can be controlled through control signals.

Joined to the movable part 12 of the force-measuring cell 10 through a rigid connection is a first end of a force-transmitting device 32. The second end of the force-transmitting device 32, farther from the force-measuring cell 10, forms a weight-receiving seat 33 through which a predefined force $F_C$ can be introduced to the force-measuring cell 10 by the calibration arrangement 40. This force $F_C$ is then directly passed on to the force-measuring cell 10 by the force-transmitting device 32. The predefined force $F_C$ thus acts on the force-measuring cell 10 in a similar way as the weight $F_W$ of the weighing object which is placed on the weighing pan. The predefined force $F_C$ in this embodiment is generated by the weight force of the calibration weight 41 of the calibration arrangement 40 acting on the weight receiving seat 33.

The housing of the calibration arrangement 40 has suitable openings in the housing wall through which the second end of the force-transmitting device 32 reaches into the interior of the housing so that it can receive the weight force of the calibration weight 41. In other possible configurations, parts of the calibration weight 41 or extensions of the latter can protrude through openings, for example elongated holes, in the housing wall to the outside of the housing of the calibration arrangement 40 in order to allow the calibration weight 41 to be coupled to a force-transmitting device 32 that is located outside of the housing.

Following is a brief description of a calibration cycle. During a calibration, there should be no force $F_W$ acting on the load-receiving area 30. Accordingly, there should also be no forces acting on the force-measuring cell 10 at the beginning of the calibration cycle.

Figure 2A:
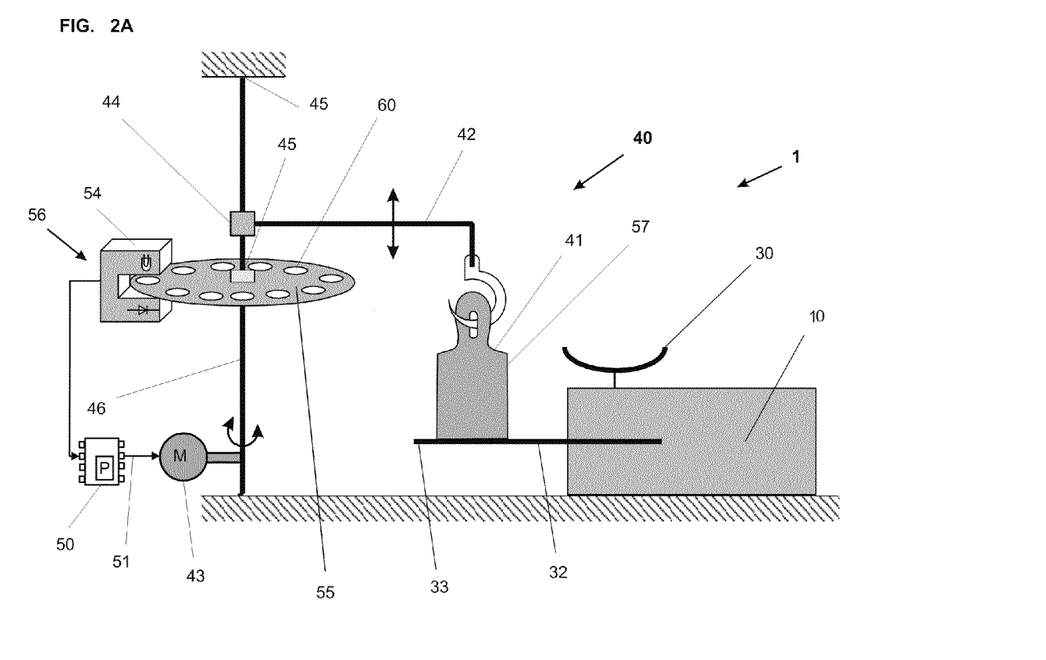
FIG. 2A is a schematic representing an exemplary calibration arrangement with a counter disk and a light gate, wherein a calibration weight is in a calibration position.

At the beginning of a calibration cycle, the calibration weight 41 is lowered by means of the electric motor 43 (M) into the calibration position 57 (as shown in FIG. 2A) on the weight-receiving seat 33. This serves two purposes: first, the calibration arrangement 40 is coupled to the force-measuring cell 10, and second, a predefined force $F_C$ (i.e. the weight force of the calibration weight 41) is brought to bear on the force-measuring cell 10.

In the subsequent phase, the measurement signal $S_F$ generated by the force-measuring cell 10 is passed on to the processing unit 60 where the signal $S_F$ is evaluated in relation to the predefined force $F_C$ of the calibration weight 41. The results gained from this process are used to optimize the calculation parameters in the processing unit 60. However, the results could also be passed on to the indicator unit 70 or to a further processing unit 60.

To conclude the calibration cycle, the calibration weight 41 is raised and thus removed from the weight-receiving seat 33 by means of the electric motor 43 (M). The calibration arrangement 40 is thereby uncoupled from the force-measuring cell 10 and is brought into the rest position 58, so that the force-measuring cell 10 cannot be influenced by the calibration arrangement 40 when the balance is in the normal measuring mode. In the subsequent normal operating mode, the measurements of the weighing object are processed by using the optimized calculation parameters.

Figure 2B:
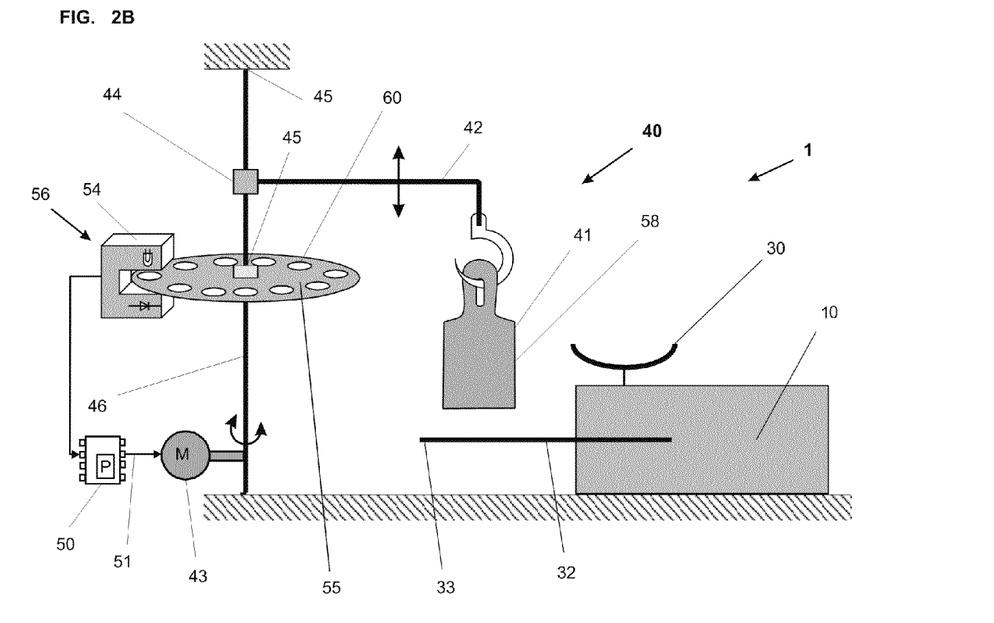
FIG. 2B is a schematic representing an exemplary calibration arrangement with a counter disk and a light gate, wherein a calibration weight is in a rest position.

FIGS. 2A and 2B illustrates an exemplary calibration arrangement with a counter disk and a light gate in a schematic format. This serves to illustrate how the calibration weight 41 is moved up and down and how its travel distance is measured.

As shown in FIGS. 2A and 2B, the electric motor 43 drives a threaded spindle 46. The latter can turn in one or the other direction. Coupled to the same threaded spindle 46 is a lifting device consisting of a transfer mechanism 44 and a pick-up arm 42. When the electric motor 43 is activated, the threaded spindle 46 is set into rotation, and the pick-up arm 42 is raised or lowered. The calibration weight 41 is hanging on the pick-up arm 42 and is thus brought from the rest position 58 into the calibration position 57 or vice versa.

The range of the threaded spindle 46 where the pick-up arm 42 can move is delimited at one end by the counter disk 55 which is attached to the threaded spindle 46 and at the other end by the bearing. In this embodiment, the counter disk 55 forms a first end stop 45, and the bearing of the threaded spindle 46 forms a second end stop 45. The end stops 45 could also consist of other elements of the calibration arrangement 40.

The threaded spindle 46 and the counter disk 55 are in this case turning synchronously with the electric motor 43. The counter disk 55 is perforated with holes 60 lying at regular intervals along a circle that is centered on the axis and runs inside the circumference of the counter disk 55. A light gate 54 is arranged in such a way in relation to the counter disk 55 that the light from the emitter can pass through one of the holes of the counter disk 55 and can thus be received by the sensor. As a result, a signal is generated and sent to the calibration control unit 50. In response, the internal counter of the calibration control unit 50 is incremented by one. The counter disk 55 and the light gate 54 together thus constitute a counter system 56.

The calibration control unit 50 contains, among other elements, a counter and a memory element in which the values of the parameters A, B and C can be stored. One of these parameters is the reference to which the counter is compared in order to determine whether or not the electric motor 43 needs to be stopped. The latter is controlled by the calibration control unit 50 by way of a control line.

Figure 3:
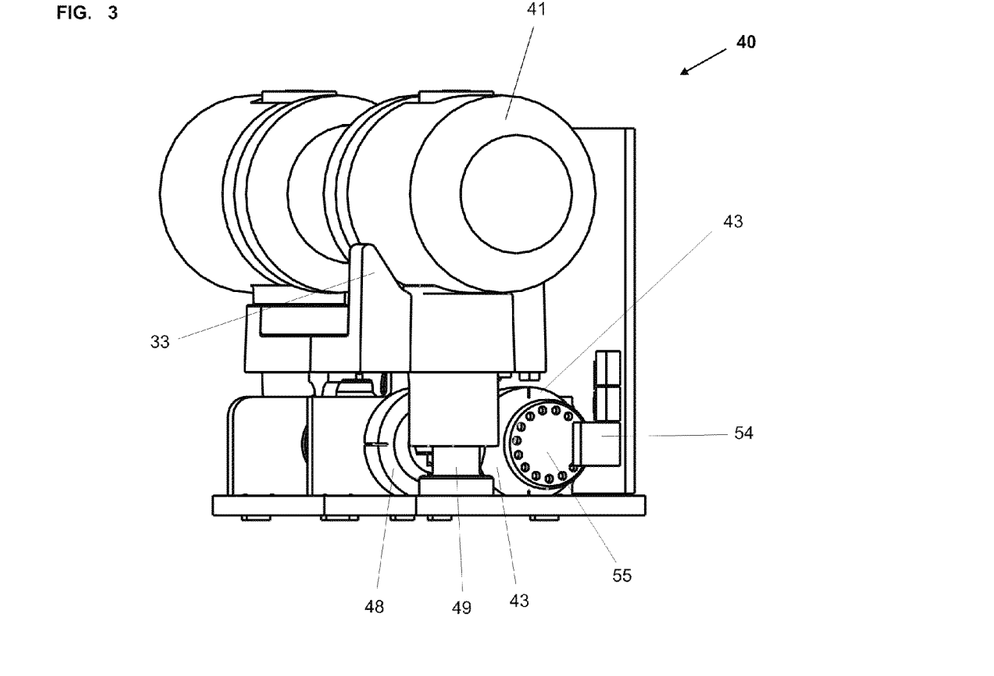
FIG. 3 illustrates an exemplary embodiment of a calibration arrangement.

FIG. 3 illustrates an exemplary embodiment of a calibration arrangement 40 according to the inventive concept. In contrast to FIGS. 2A and 2B, the calibration weight 41 is not hanging from a pick-up arm 42 above the force-transmitting device but rests on a weight-receiving seat 33. When the latter is lowered, the calibration weight 41 is coupled to the force-transmitting device through a fork.

Mounted on the base are two vertical guide posts 49, the drive system 43, and the circuit board carrying the electronic components. The weight-receiving seat and the calibration weight 41 each have two holes through which the guide posts 49 pass. Thus, the weight can only be moved vertically up and down. The weight-receiving seat 33 is raised and lowered from below by a cam disk 48 which is driven by the electric motor 43.

The counter disk 55 is mounted on the axle of the electric motor 43 and therefore shares the rotation of the cam disk 48.

The circuit board with the electronic components is located to the rear of the arrangement. The light gate 54, the calibration control unit 50 (Not shown in FIG. 3) and the electric motor 43 are either arranged on the circuit board or electrically connected to it.

Figure 4:
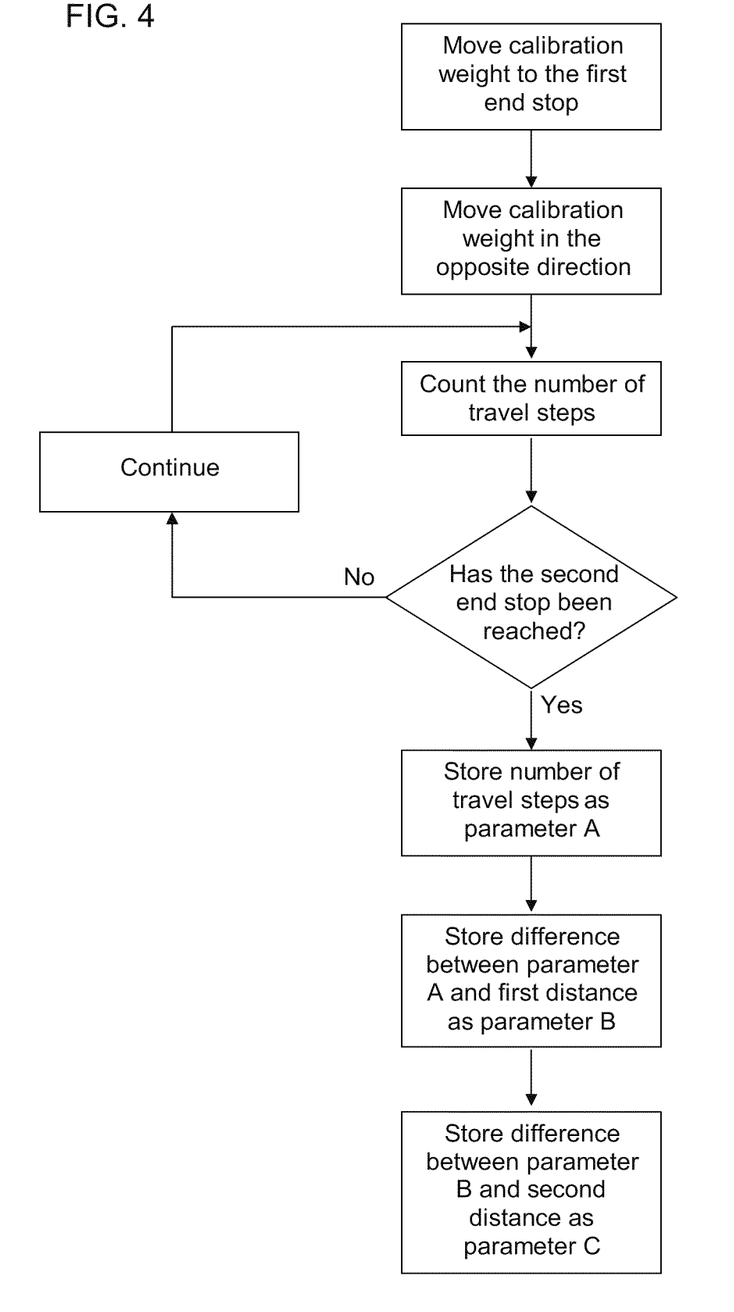
FIG. 4 is a flowchart diagram describing the exemplary procedure followed in the assembly according to the inventive concept.

FIG. 4 illustrates the sequence of steps of the exemplary method that is followed in the assembly for the adjustment of the rest position 58 and the calibration position 57 of the calibration weight 41, according to the present invention.

After the calibration arrangement 40 has been assembled, the travel distance between the two end stops 45 needs to be measured. The result, i.e. the number of steps counted between the end stops 45 needs to be stored in the calibration control unit 50 as the value for the parameter A. To perform this step, the electric motor 43 is started. At the point where the calibration weight 41 is held up by a first end stop 45, the motor is interrupted and the counter system 56 is set to zero by the calibration control unit 50. Next, the electric motor 43 is started in the opposite direction. From this point on, the counter system 56 counts the number of travel steps completed until the calibration weight 41 meets the second end stop 45 and the electric motor is stopped again. To conclude the procedure, the number of travel steps counted is stored as parameter A in the calibration control unit 50. In addition, the parameter B representing the distance between the first end stop 45 and the rest position 58 and the parameter C representing the distance between the calibration position 57 and the rest position 58 are determined by means of the parameter A and stored in memory. The number of travel steps—representing the distance between the rest position 58 and the second end stop 45—which are subtracted from the parameter A in order to arrive at the parameter B can be obtained as:

2 to 5 travel steps 2 to 3% of the travel steps that correspond to parameter A.

As the rest position 58 and the calibration position 57 should be near the end stops 45 in order to ensure a clearly defined position for the calibration weight 41, it is especially advantageous if the entire number of travel steps (corresponding to the distance between the rest position 58 and the calibration position 57) that are subtracted from the parameter A in order to arrive at the parameter C does not exceed a proportion of 5% of the parameter A.

To ensure that the transfer mechanism 44 does not come into contact with the end stops 45, the rest position 58 and the calibration position 57 should each be at least two travel steps removed from the respective nearest end stop 45.

Figure 5:
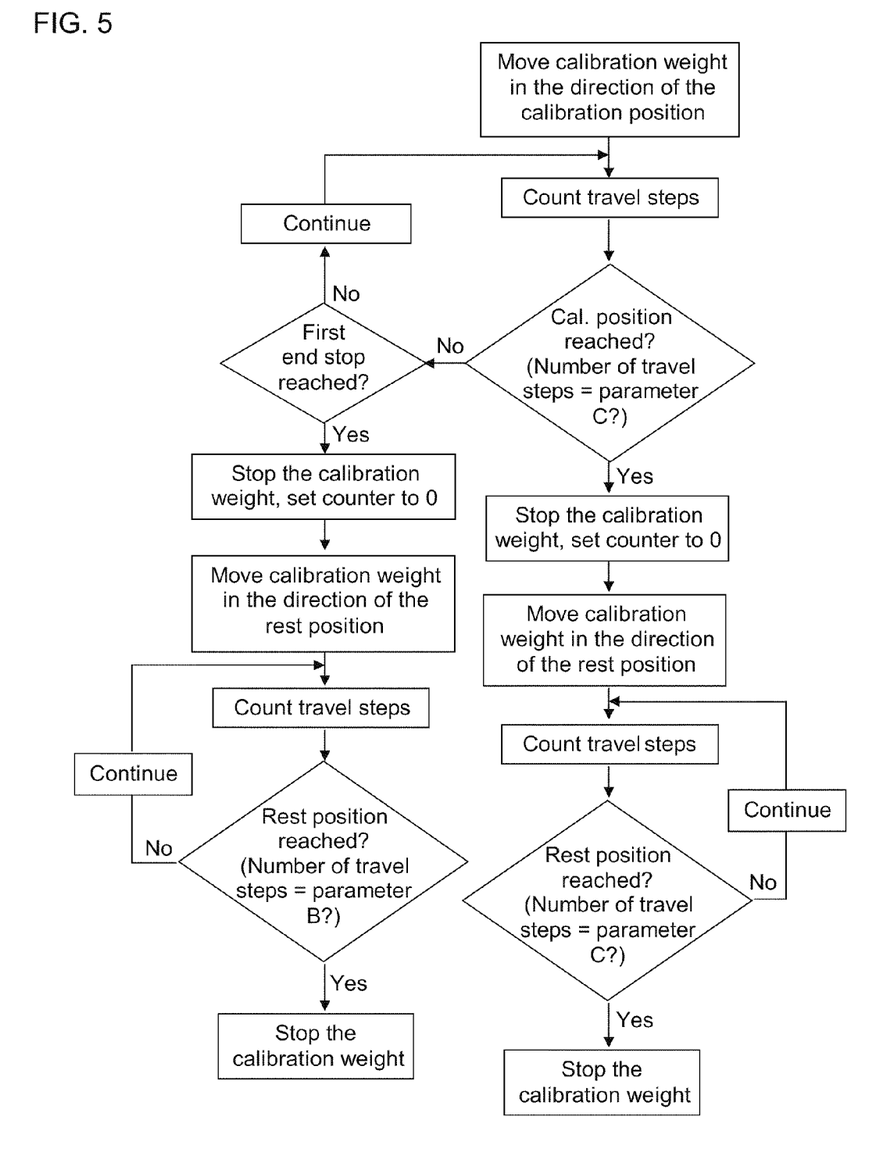
FIG. 5 is a flowchart diagram describing the exemplary procedure followed in the starting-up of the balance according to the inventive concept.

FIG. 5 illustrates an exemplary initialization routine which is executed during the start-up of the balance in order to ensure that the calibration weight 41 is in the right place for the operating mode of the balance, i.e. in the rest position 58. First, the electric motor 43 is activated, so that the calibration weight 41 is moved into the calibration position 57. The number of travel steps covered is counted and compared to a stored parameter C which corresponds to the distance between the rest position 58 and the calibration position 57. When the calibration position 57 has been reached, the electric motor is stopped and the counter system 56 is set to zero.

Then, the electric motor 43 is started in the opposite direction, so that the calibration weight 41 is moved to the rest position 58. During this movement, the number of travel steps is counted and compared to a stored parameter C which represents the distance from the rest position 58 to the calibration position 57. At the point where the number of travel steps completed equals this stored parameter, the motor 43 is stopped again. The calibration weight 41 is now in the rest position 58.

If the calibration weight 41 had run into the end stop 45 and been stopped on its way to the calibration position 57, this could mean that at the start-up of the balance the calibration weight 41 was already at a point between the rest position 58 and the calibration position 57. The motor 43 should therefore be interrupted at the end stop 45, the counter system 56 should be set to zero, and the calibration weight 41 should be brought into the rest position 58. To move the calibration weight 41 to the rest position 58, the electric motor 43 is started in the opposite direction. The number of travel steps completed during the movement is counted and compared to a stored parameter B which corresponds to the distance between the first end stop 45 and the rest position 58. When the number of travel steps completed equals this stored parameter, the motor 43 is stopped again. The calibration weight 41 is now in the rest position 58.

Should the calibration weight 41 be stopped again on its way to the rest position 58 before actually arriving there, one could draw the conclusion that the drive system 43 is defective.

Figure 6:
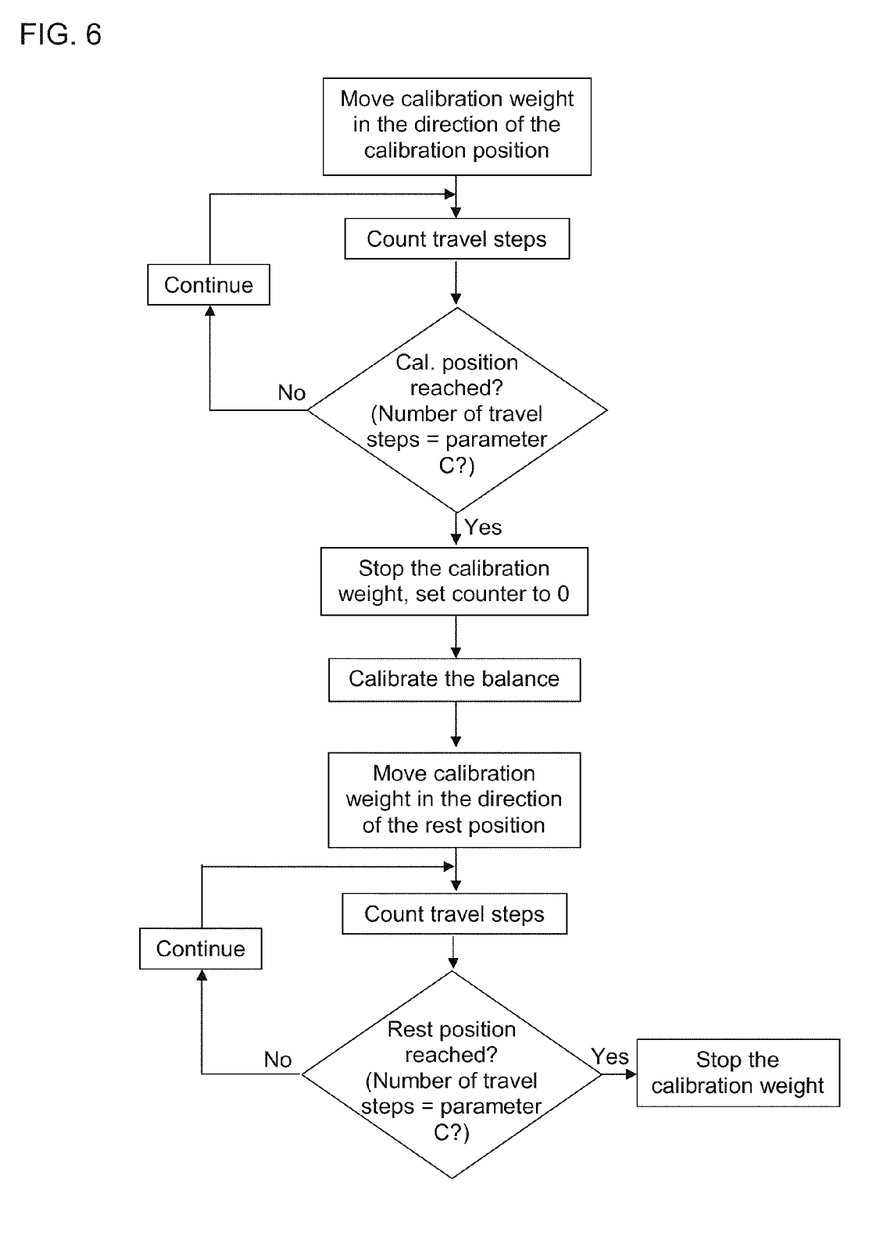
FIG. 6 is a flowchart diagram describing the exemplary procedure of calibrating the balance according to the inventive concept.

FIG. 6 describes how the calibration weight 41 is moved and its travel is controlled during the calibration of the balance 1.

At the start of the calibration, the electric motor 43 is activated, so that the calibration weight 41 is moved into the calibration position 57. The number of travel steps covered is counted and compared to a stored parameter C which corresponds to the distance between the rest position 58 and the calibration position 57. When the calibration position 57 has been reached, the electric motor 43 is stopped and the counter system 56 is set to zero. In the calibration position 57, the calibration weight 41 is coupled to the force-measuring cell 10. In other words, by means of the calibration weight 41 a force is brought to bear on the force-measuring cell 10. This force generates a measurement signal which is passed on to the processing unit 60 where it is evaluated in relation to the predefined force $F_C$ of the calibration weight 41.

Next, the electric motor 43 is started, so that the calibration weight 41 is moved to the rest position 58. During this movement, the number of travel steps is counted and compared to a stored parameter C which represents the number of steps from the rest position 58 to the calibration position 57. At the point where the number of travel steps completed equals this stored parameter, the motor is stopped. The calibration weight 41 is now in the rest position 58; the balance is calibrated and ready to use.

The travel distance can be registered after every movement of the calibration weight 41. Preferably, a time value is also added to the log entry, so that a history file is available in the memory unit. This provides the possibility to review past calibrations and/or initializations.

The elapsed time between two completed travel steps can be measured and registered. Accordingly, the speed of movement of the calibration weight 41 can also be calculated and thus controlled. Consequently, the calibration weight 41 can be moved according to predefined velocity profiles. For example when approaching the calibration position 57, a soft coupling of the weight to the calibration position 57 can be achieved by moving at a slow speed.

Prior to each movement of the calibration weight 41 the counter should be set to zero. Thus, the current count is always proportional to the travel distance covered by the pick-up arm 42 or the cam disk 48.

Although the invention has been described by presenting specific exemplary embodiments, it is obvious that numerous further variants could be created based on a knowledge of the present invention, for example by combining the features of the individual examples of embodiments with each other and/or by interchanging individual functional units between the embodiments. Thus scope of the invention is not to be considered limited by such disclosure, and modifications are possible without departing from the spirit of the invention as evidenced by the following claims:

What is claimed is:

1. A method of adjusting a calibration arrangement of an electronic balance during a production process, said electronic balance comprising a calibration arrangement and a force-measuring device, said calibration arrangement comprising a transfer mechanism having a drive system, wherein the calibration arrangement couples at least one calibration weight to the force-measuring device, said coupling being effected by the transfer mechanism transferring the calibration weight in a guided movement between a rest position and a calibration position, wherein the method comprises the following steps:
   moving the calibration weight into a first end stop;
   moving the calibration weight into a second end stop;
   measuring a travel distance between the two end stops by the use of a counter system, wherein said travel distance is divided into travel steps measured incrementally;
   storing the number of said travel steps between the two end stops as a first parameter;
   subtracting from the first parameter a second number of travel steps representing a defined distance from the first end stop, storing the difference as a second parameter, wherein said parameter is the distance between a rest position and the first end stop; and
   subtracting from the second parameter a third number of travel steps representing a defined distance from the second end stop, storing the difference as the travel distance between the rest position and a calibration point.

2. The method of claim 1, wherein the difference between said first parameter and said second number of travel steps representing a defined distance from said first end stop defined the rest position.

3. The method of claim 1, wherein the difference between said first parameter and the third number of travel steps representing a defined distance from said second end stop defines the calibration point.

4. The method of claim 1, further comprising positioning said rest position at least two travel steps away from the nearest end stop, wherein the distance between said rest position and said end stop is a first set-back 5. The method of claim 4, further comprising positioning said calibration point at least two travel steps away from the nearest end stop, wherein the distance between said calibration position and said end stop is a second set-back.

6. The method of claim 5, wherein the sum of the first and second set-backs is not to exceed about 5% of said first parameter.

7. A method of initializing a calibration arrangement, comprising:
   moving a calibration weight of a balance adjusted according to claim 1, upon start-up, from said rest position to said calibration position in accordance with the number of travel steps stored as said third parameter;
   returning said calibration weight to said rest position in accordance with the number of travel steps stored as said third parameter; and
   measuring the travel distance covered by said calibration weight using the counter system.

8. The method of claim 7, further comprising returning said calibration weight to said rest position in accordance with the number of travel steps stored as said second parameter if the calibration weight arrives at said first end stop, from said rest position, without having traveled a number of travel steps equal to said third parameter at start-up; and
   measuring the travel distance covered by said calibration weight using the counter system.

9. A method of calibrating an electronic balance during a production process, the electronic balance comprising a calibration arrangement and a force-measuring device, the calibration arrangement comprising a transfer mechanism having a drive system, wherein the calibration arrangement couples at least one calibration weight to the force-measuring device, the coupling being effected by the transfer mechanism transferring the calibration weight in a guided movement between a rest position and a calibration position, wherein the electronic balance has had the calibration arrangement adjusted and initialized in the following manner:
   a) adjusting the calibration arrangement by the steps of:
      moving the calibration weight into a first end stop;
      moving the calibration weight into a second end stop;
      measuring a travel distance between the first and second end stops by the use of a counter system, wherein the travel distance is divided into travel steps measured incrementally;
      storing the number of the travel steps between the first and second end stops as a first parameter;
      subtracting from the first parameter a second number of travel steps representing a defined distance from the first end stop and storing the difference as a second parameter, wherein the second parameter is the distance between a rest position and the first end stop; and
      subtracting from the second parameter a third number of travel steps representing a defined distance from the second end stop and storing the difference as a travel distance between the rest position and a calibration point; and
   b) initializing the adjusted calibration arrangement by the steps of:
      moving the calibration weight, upon start-up, from the rest position to the calibration position using the number of travel steps stored as the third parameter;
      returning the calibration weight to the rest position using the number of travel steps stored as the third parameter; and if the calibration weight arrives at the first end stop, from the rest position, without having traveled a number of travel steps equal to the third parameter at start-up, then returning the calibration weight to the rest position using the number of travel steps stored as the second parameter; and measuring the travel distance covered by the calibration weight using the counter system;

the method of calibrating comprising the steps of:

moving the calibration weight of the adjusted and initialized electronic balance between the rest position and the calibration position in accordance with the number of travel steps stored as the third parameter; and measuring the travel distance covered by the calibration weight using the counter system.

10. The method of claim 9, further comprising imposing a velocity profile on the movement of said calibration weight.

11. A device comprising:

a calibration arrangement and a force-measuring device, said calibration arrangement including a transfer mechanism having an associated drive system; said transfer mechanism transfers at least one calibration weight in a guided movement between a rest position and calibration position, wherein when said at least one calibration weight is coupled to said force-measuring device when in said calibration position;

a counter system, said counter system measuring the travel distance of said at least one calibration weight; and a storage device in communication with said counter system for storing said measured travel distance, wherein the first mentioned device comprises an electronic balance calibrated by the method of claim 9.

12. The device of claim 11, wherein the counter system includes a disk and a light gate, said disk defining holes lying at regular intervals along a circle that is centered on the axis.

13. The device of claim 12, wherein said holes are elongated passages.

14. The device of claim 12, wherein said holes are round.

15. The device of claim 11, wherein the counter system includes a light gate and a wheel with serrations along its edge.

16. The device of claim 11, wherein the counter system includes a light gate and a bar defining uniformly distributed holes.

17. The device of claim 11, wherein said counter system includes a multiplier-ratio device.

18. The device of claim 11, wherein said counter system includes a sensor for reflected light and a disk having indentions, wherein said indentions lie at regular intervals along a circle that is centered on the axis and wherein said indentions are coated with a reflective material.

\* \* \* \* \*